(12) United States Patent
Liu et al.

(10) Patent No.: US 9,449,306 B2
(45) Date of Patent: *Sep. 20, 2016

(54) USER IDENTIFIER MANAGEMENT

(75) Inventors: Su Liu, Round Rock, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 738 days.

This patent is subject to a terminal disclaimer.

(21) Appl. No.: 13/445,651

(22) Filed: Apr. 12, 2012

(65) Prior Publication Data

US 2012/0209866 A1    Aug. 16, 2012

Related U.S. Application Data

(63) Continuation of application No. 12/944,023, filed on Nov. 11, 2010.

(51) Int. Cl.
*G06F 17/30* (2006.01)
*G06Q 10/10* (2012.01)

(52) U.S. Cl.
CPC .................................. *G06Q 10/105* (2013.01)

(58) Field of Classification Search
None
See application file for complete search history.

(56) References Cited

U.S. PATENT DOCUMENTS

| | | | |
|---|---|---|---|
| 5,600,832 A | 2/1997 | Eisenberg et al. | |
| 7,409,715 B2 | 8/2008 | Gariador et al. | |
| 7,765,298 B2 | 7/2010 | Villavicencio | |
| 8,185,646 B2 | 5/2012 | Headley | |
| 2001/0047281 A1* | 11/2001 | Keresman et al. | 705/2 |
| 2007/0027807 A1 | 2/2007 | Bronstein | |
| 2007/0089167 A1 | 4/2007 | Villavicencio | |
| 2008/0207329 A1 | 8/2008 | Wallace et al. | |
| 2010/0088753 A1 | 4/2010 | Ayres et al. | |
| 2010/0115114 A1 | 5/2010 | Headley | |
| 2012/0124067 A1 | 5/2012 | Liu et al. | |

FOREIGN PATENT DOCUMENTS

| | | |
|---|---|---|
| JP | 2005346537 A | 12/2005 |
| WO | 2007016541 A2 | 2/2007 |
| WO | 2009140663 A1 | 11/2009 |

OTHER PUBLICATIONS

Drupal Issue 950228, Prevent Homographic Logins (Impersonation). Oct. 23, 2010. http://drupal.org/node/950228.*
Drupal Issue 85826, Prevent Homographic Logins. Sep. 24, 2006. http://drupal.org/node/85826.*

(Continued)

*Primary Examiner* — Syed Hasan
(74) *Attorney, Agent, or Firm* — Yee & Associates, P.C.; David Woycechowsky (57) ABSTRACT

The different illustrative embodiments provide a method for managing user identifiers presented in accordance with an illustrative embodiment. In an illustrative embodiment, a determination is made whether the new user identifier matches an existing user identifier according to a policy for a minimum degree of character variation between the new user identifier and the existing user identifier responsive to receiving a request to store a new user identifier. The request to store the new user identifier is rejected responsive to a determination that the new user identifier matches the existing user identifier according to the policy. The request is approved responsive to an absence of a determination that the new user identifier matches the existing user identifier according to the policy.

12 Claims, 6 Drawing Sheets

(56) References Cited

OTHER PUBLICATIONS

Unicode Technical Standard #39, Unicode Security Mechanisms. Oct. 26, 2009. http://web.archive.org/web/20091026175242/http://www.unicode.org/reports/tr39/.*

Livenation, Terms & Conditions: Terms of Use. Jun. 18, 2010. http://web.archive.org/web/20100618201045/http://www.livenation.com/h/terms.html.*

"Not Playing Ball", Twitter Blog, blog.twitter.com/.../not-playing-ball.html, Jun. 6, 2009, 4 pages.

USPTO Office Action, U.S. Appl. No. 12/944,023, dated Nov. 14, 2012, 14 pages.

USPTO Final Office Action, U.S. Appl. No. 12/944,023, Apr. 12, 2013, 13 pages.

Notice of Allowance, dated Apr. 29, 2016, regarding U.S. Appl. No. 12/944,023, 5 pages.

* cited by examiner

USER IDENTIFIER MANAGEMENT

This application is a continuation/divisional of application Ser. No. 12/944,023, filed Nov. 11, 2010, status pending.

BACKGROUND

1. Field:

The disclosure relates generally to an improved data processing system and more specifically to user identifier management. Even more specifically, the disclosure relates to a method, computer program product, and apparatus for managing user identifiers.

2. Description of the Related Art

Users of data processing systems are commonly identified using a user identifier. A user identifier is a name that uniquely identifies the user in the data processing system. The user identifier is used for many tasks in the operation of the data processing system. For example, the user identifier may be used to generate log entries associated with the user, store the user that created or modified a file, or other suitable purposes. One example of a user identifier is "JohnSmith."

User identifiers may also be used by international users that communicate in languages other than English. The user identifier for the international user may contain characters not present in the English language. For example, a user identifier for a Chinese user may contain Chinese characters. Characters in English and other languages entered into a data processing system are mapped into code points before the characters are stored. Mapping, as used herein, means performing a translation. For example, a data processing system may map a character into a code point in a standardized character code system by translating the character into the code point that corresponds to the character in the standardized character code system. The code point uniquely identifies the character from all the possible characters known to the data processing system. A code point is a collection of bits that may be represented by letters, numbers, symbols, or a combination of letters, numbers, and/or symbols.

The code points are standardized among data processing systems so characters appear the same on different data processing systems presenting the same data. In other words, multiple data processing systems use the same code points to identify the same characters. One example of a standardized code system for characters is Unicode. In Unicode, the letter 'a' is mapped into the code point U+0061. Characters in other languages are mapped into code points as well. For example, the letter "ö" is mapped into the code point U+00F6. In these examples, the code points are represented with four or more hexadecimal numbers.

In a standardized code system, some characters in the system may have one or more character variants. As used herein, a character variant is a character that appears visually similar to another character, but has a different code point in the standardized code system. For example, the character "北" has the code point U+5317, while the character "北" has the code point U+F963. The characters may appear to a human to be visually similar, but a data processing system stores the characters as different code points without being related.

SUMMARY

The different illustrative embodiments provide a method for managing user identifiers presented in accordance with an illustrative embodiment. In an illustrative embodiment, a determination is made whether the new user identifier matches an existing user identifier according to a policy for a minimum degree of character variation between the new user identifier and the existing user identifier responsive to receiving a request to store a new user identifier. The request to store the new user identifier is rejected responsive to a determination that the new user identifier matches the existing user identifier according to the policy for the minimum degree of character variation between the new user identifier and the existing user identifier. The request is approved responsive to an absence of a determination that the new user identifier matches the existing user identifier according to the policy for the minimum degree of character variation between the new user identifier and the existing user identifier.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
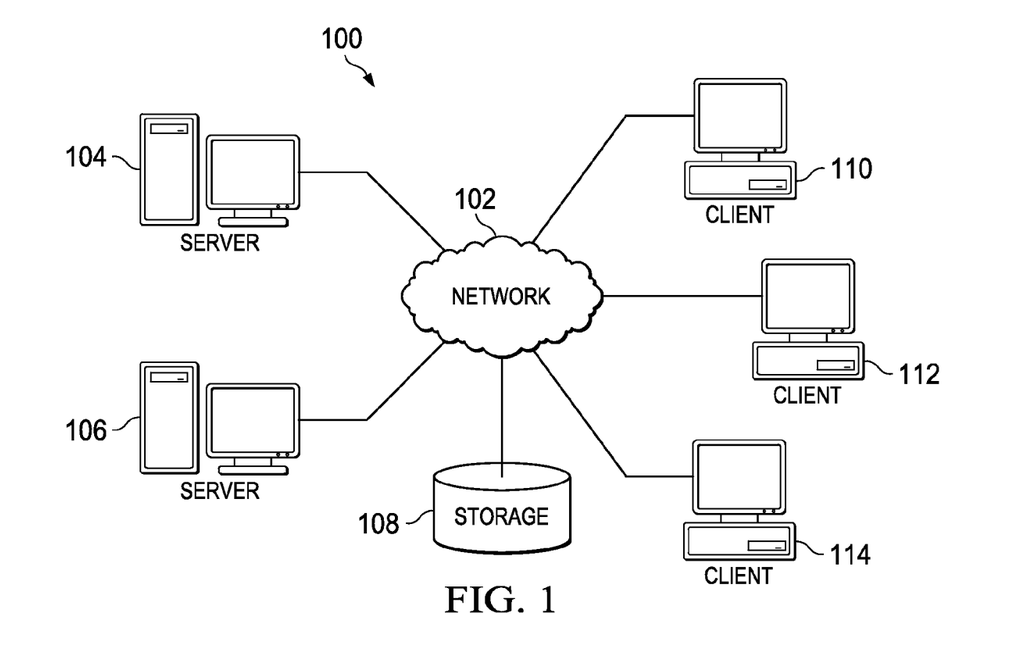
FIG. 1 is an illustration of a network of data processing systems in which illustrative embodiments may be implemented.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation, for the different illustrative embodiments.

In these examples, client computer 110 sends a request to server computer 104 over network 102. The request contains a desired user name for accessing server computer 104. Server computer 104 receives the request and determines whether a minimum degree of character variation exists between the desired user name and existing user names in server computer 104. In the event that the minimum degree of character variation exists, the desired user name is accepted and the user name is stored on server computer 104. In the event that the minimum degree of character variation is not met, the desired user name is rejected and not stored in server computer 104.

Figure 2:
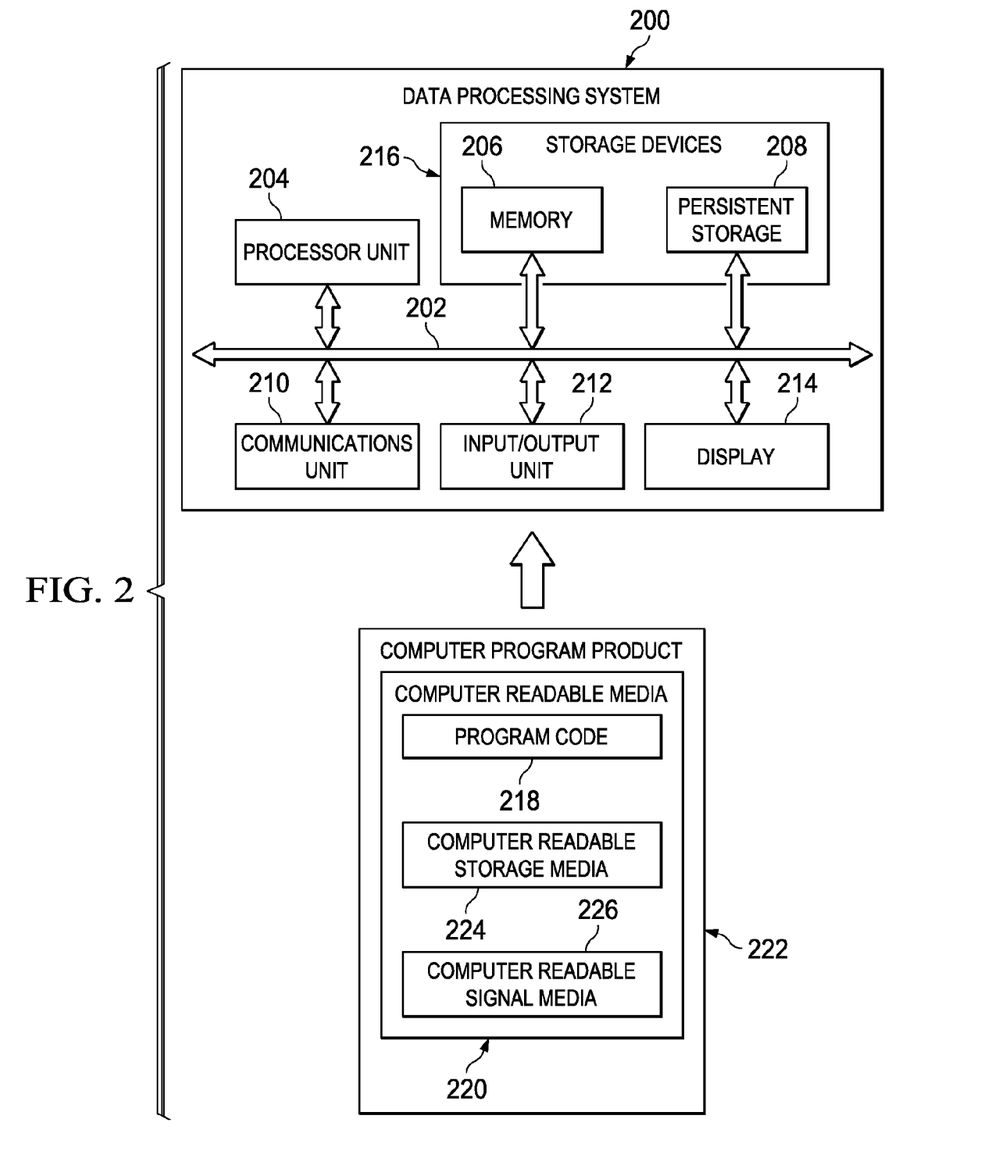
FIG. 2 is an illustration of a data processing system in accordance with an illustrative embodiment.

Turning now to FIG. 2, an illustration of a data processing system is depicted in accordance with an illustrative embodiment. Data processing system 200 may be an example of data processing system 302 and/or data processing system 304 in FIG. 3. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 404 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments recognize and take into account a number of different considerations. For example, in many data processing systems, a user selects a user identifier for the user. The data processing system may require that the user identifier be unique so that one user is not confused or mistaken for another user. For example, in a social network, the user names in the data processing system may be unique so other users may identify the user that made a posting or performed an action. In data processing systems that store user names, malicious users may select a user identifier for the data processing system that contains one or more character variants of an existing user identifier. The user name is unique in the data processing system because no other user name has the same order of character codes.

The different illustrative embodiments also recognize and take into account that user identifiers are commonly used in data processing systems to identify users. More specifically, user identifiers may be used in network environments to allow other users of the network environment to identify the author of comments or the performer of actions. For example, a first user may see a comment in a social network posted by a second user with the user identifier "JohnSmith." Based upon previous social dealings with the second user, the first user may associate a particular reputation and identity with comments allegedly posted by "JohnSmith."

The different illustrative embodiments also recognize and take into account that characters in a character code system used in data processing systems may contain one or more character variants for a character. Because the character variants may appear, to a human, to be visually similar or identical to another character in the character code system that has a different code point in the character code system, the character variants may be difficult or impossible for a user to visually distinguish from the other character. Therefore, during user account creation, a malicious user may provide a desired user identifier containing one or more character variants of an existing user identifier. The desired user identifier is considered unique by the data processing system because the desired user identifier does not contain the same string of character codes as the existing user identifier.

The different illustrative embodiments recognize and take into account that the creation of user identifiers that contain a string of characters that match an existing user identifier, except for characters replaced with character variants of the existing user identifier, is disadvantageous. Such user identifiers may be used by malicious users to post comments and/or perform actions that visually appear to other users to be posted by a user that has not authorized the malicious users to enter such comments or actions. The malicious user may gain access to personal and/or confidential information by using the relationships between a user and the individual with the visually similar user identifier.

For example, a user may be apt enough to not provide a stranger with the credit card number of the user. However, when the user believes that the mother of the user is asking for the credit card number based on a visually similar user identifier, the user may provide the credit card number to the malicious user because the user believes the mother of the user is requesting the number.

Thus, the different illustrative embodiments provide a method, computer program product, and apparatus for managing user identifiers presented in accordance with an illustrative embodiment. In an illustrative embodiment, a determination is made whether the new user identifier matches an existing user identifier according to a policy for a minimum degree of character variation between the new user identifier and the existing user identifier responsive to receiving a request to store a new user identifier. The request to store the new user identifier is rejected responsive to a determination that the new user identifier matches the existing user identifier according to the policy for the minimum degree of character variation between the new user identifier and the existing user identifier. The request is approved responsive to an absence of a determination that the new user identifier matches the existing user identifier according to the policy for the minimum degree of character variation between the new user identifier and the existing user identifier.

Figure 3:
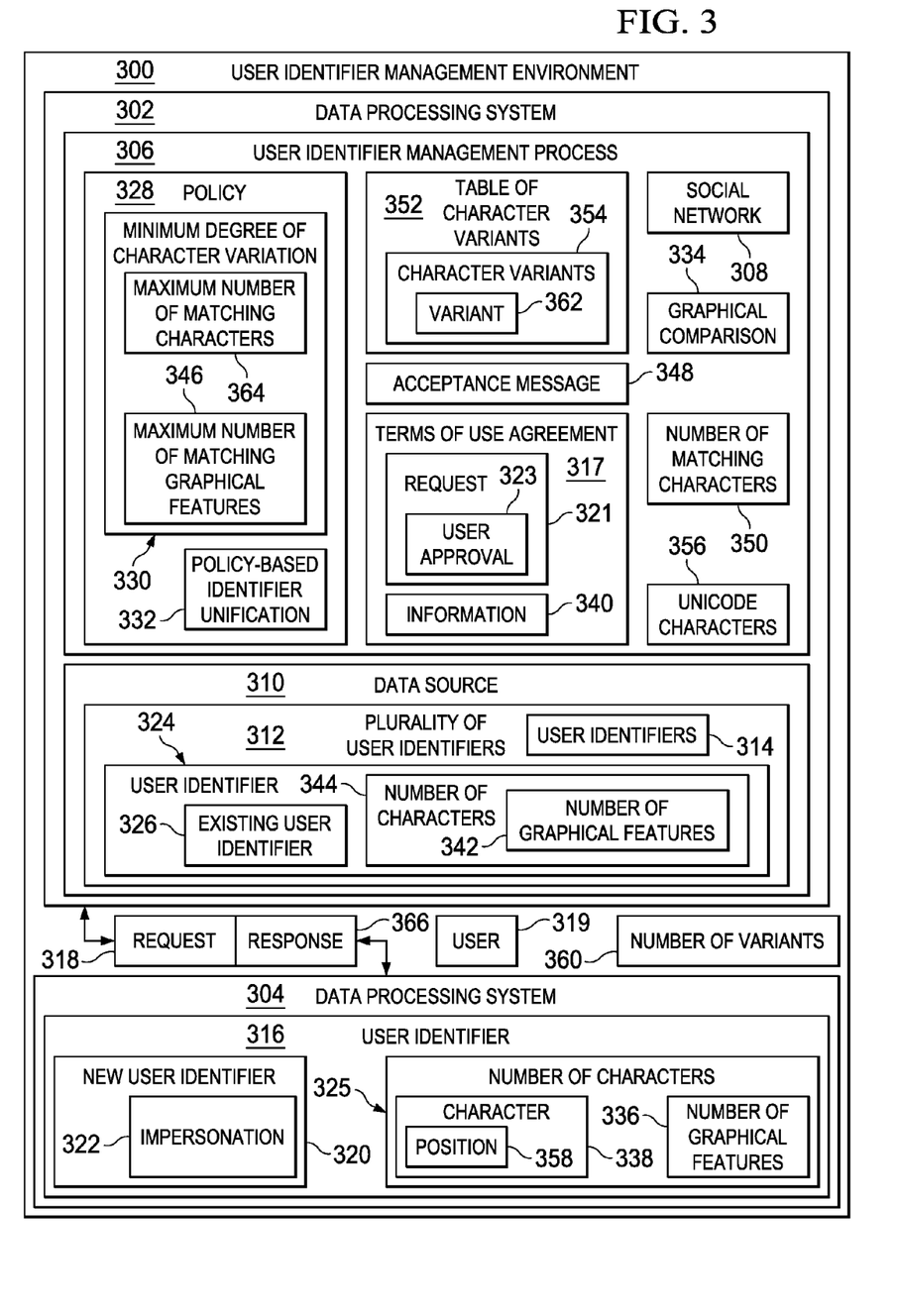
FIG. 3 is an illustration of a block diagram of a user identifier management environment in accordance with an illustrative embodiment.

Turning now to FIG. 3, an illustration of a block diagram of a user identifier management environment is depicted in accordance with an illustrative embodiment. User identifier management environment 300 is an example environment in which illustrative embodiments may be implemented. For example, user identifier management environment 300 may be implemented in network data processing system environment 100 in FIG. 1.

User identifier management environment 300 contains data processing system 302 and data processing system 304.

Data processing system 302 is an example implementation of data processing system 200 in FIG. 2.

Data processing system 302 runs user identifier management process 306. In these examples, data processing system 302 runs user identifier management process 306 using a processor unit, such as processor unit 204 in FIG. 2. In these illustrative examples, user identifier management process 306 may be run on the processor unit using program code that is run by the processor unit, hardware in the processor unit, or a combination of program code and hardware.

As depicted, user identifier management process 306 may be a component of a network environment. For example, user identifier management process 306 may be a component of social network 308 in some illustrative embodiments. Social network 308 is one or more processes running on data processing system 302 that links users to other users based on a connection between the users. The connection may be, for example, a friendship, professional association, or other suitable relationship.

Data processing system 302 also contains data source 310. Data source 310 is a collection of data stored in data processing system 302. Data source 310 may be implemented in storage devices 216 in FIG. 2 in some illustrative embodiments. Of course, in other illustrative embodiments, data source 310 is stored partially or entirely on another data processing system. In such illustrative embodiments, data processing system 302 may use a network, such as network 102 in FIG. 1, to access data source 310.

In these examples, data source 310 contains plurality of user identifiers 312. Plurality of user identifiers 312 are user identifiers 314 stored in data source 310. User identifiers 314 are the identifiers associated with existing users of data processing system 302. For example, "JohnSmith" may be a user identifier in user identifiers 314. User identifiers 314 are used to identify the user that entered or modified data in data processing system 302. Additionally, user identifiers 314 may be used as part of an authentication process for users accessing data processing system 302. An authentication process is a process that receives an identity of a user and credentials for the user and verifies that the credentials correspond to the identity. For example, a user may provide a user identifier and a password for the user identifier to access resources on data processing system 302. The authentication process determines whether the password provided by the user is the same password stored with the user identifier in data processing system 302. The user may then access resources on data processing system 302. User identifier management process 306 may add to plurality of user identifiers 312 in data source 310, remove plurality of user identifiers 312 from data source 310, and/or modify plurality of user identifiers 312.

In these examples, user 319 of data processing system 304 desires to create an account on data processing system 302 with user identifier 316. In other words, user 319 desires to generate new user identifier 320 on data processing system 302. In this illustrative example, new user identifier 320 is an impersonation 322 of existing user identifier 326. Of course, in other illustrative examples, new user identifier 320 may be unintentionally similar to existing user identifier 326. User identifier 316 consists of number of characters 325 in these examples. Number of characters 325 is the collection of letters, numbers, and/or symbols present in user identifier 316. For example, "J" is the first character in the user identifier "JohnSmith."

Impersonation 322 is an attempt by user 319 to generate a user account on data processing system 302 that appears to other users of data processing system 302 to be user identifier 324. User 318 may also unintentionally attempt to generate a user account on data processing system 302 that appears to other users of data processing system 302 to be user identifier 324. User identifier 324 is an existing user identifier 326 in data source 310 in this illustrative example. The impersonation appears to other users of data processing system 302 to be user identifier 324 because new user identifier 320 appears visually similar or identical to user identifier 324. However, new user identifier 320 uses one or more character variants of characters in user identifier 324. As used herein, a character variant is a character that appears visually similar to another character, but has a different code point in the standardized code system. For example, the character "北" has the code point U+5317, while the character "北" has the code point U+F963. The characters may appear to a human to be visually similar, but a data processing system stores the characters as different code points without being related.

Data processing system 304 generates request 318. Request 318 contains user identifier 316 in this illustrative embodiment. Of course, in other illustrative embodiments, request 318 may contain additional information. For example, request 318 may contain a desired a password for the account. User identifier 316 is entered by the user of data processing system 304.

In some illustrative embodiments, data processing system 304 receives terms of use agreement 317 from data processing system 302 prior to sending request 318 to data processing system 302. Terms of use agreement 317 contains information 340 about policy 328 in these examples. For example, terms of use agreement 317 may state that user identifiers to be stored on data processing system 302 will be rejected if the desired user identifier is not permitted by policy 328.

Policy 328 is a collection of rules for policy-based identifier unification 332. Policy 328 indicates whether user identifier 316 is to be accepted and stored in plurality of user identifiers 312, or whether user identifier 316 is to be rejected and not stored in plurality of user identifiers 312. Policy-based identifier unification 332 is a process in which data processing system 302 determines whether user identifier 316 has minimum degree of character variation 330 from each of user identifier 324 in plurality of user identifiers 312. User identifiers 314 make up a subset of plurality of user identifiers 312. Minimum degree of character variation 330 is the smallest difference between user identifiers 314 in plurality of user identifiers 312 that is permitted by user identifier management process 306. In these examples, minimum degree of character variation 330 is set by a human user by generating policy 328. Under policy-based identifier unification 332, data processing system 302 only accepts user identifier 316 and stores user identifier 316 in plurality of user identifiers 312 when user identifier 316 meets policy 328.

Terms of use agreement 317 may also contain request 321 for user approval 323. Request 321 for user approval 323 is a request that user 319 approve terms of use agreement 317. In these illustrative examples, request 318 is not accepted by user identifier management process 306 without user approval 323. In other words, user identifier 316 is not stored in plurality of user identifiers 312 without user approval 323 of terms of use agreement 317.

User identifier management process 306 running on data processing system 302 receives request 318 from data processing system 304. User identifier management process 306 determines whether user identifier 316 matches each user identifier 324 in plurality of user identifiers 312. First, user identifier management process 306 determines whether user identifier 316 contains the same characters in the same positions as user identifier 324 in plurality of user identifiers 312. In other words, new user identifier 320 is rejected in the event that existing user identifier 326 has the same characters in the same positions as new user identifier 320.

In these examples, user identifier management process 306 uses policy 328 to determine whether user identifier 316 matches user identifier 324. Matching means that user identifier 316 is visually similar or identical to user identifier 324. Visually similar means that visually distinguishing between user identifier 316 and user identifier 324 is difficult or impossible for a human user of data processing system 302. For example, the character "北" is visually similar to the character "北" because the two characters differ by only several pixels. More specifically, user identifier 316 matches user identifier 324 if minimum degree of character variation 330 does not exist between user identifier 316 and user identifier 324.

In one illustrative embodiment, user identifier management process 306 determines whether minimum degree of character variation 330 exists between user identifier 316 and user identifier 324 by performing graphical comparison 334 on user identifier 316 and plurality of user identifiers 312. User identifier management process 306 performs graphical comparison 334 by identifying number of graphical features 336 in number of characters 325. Number of graphical features 336 is the collection of visual characteristics of each character 338 in user identifier 316. One example of graphical comparison 334 is through analyzing bitmap images of two characters to find similarities or differences in shape. For example, the area, perimeter, angle, width length, and/or other suitable characteristics of the characters may be compared to perform graphical comparison 334. Likewise, user identifier management process 306 identifies number of graphical features 342 in number of characters 344.

User identifier management process 306 then compares number of graphical features 342 with number of graphical features 336. In some illustrative embodiments, user identifier management process 306 compares number of graphical features 342 with number of graphical features 336 by determining a number of pixels that are the same between characters in number of characters 344 and characters in number of characters 325, respectively. In other illustrative examples, user identifier management process 306 compares number of graphical features 342 with number of graphical features 336 by identifying a number of lines or geometric shapes that exist in both number of characters 344 and number of characters 325. In the event that graphical comparison 334 returns at least maximum number of matching graphical features 346 in policy 328, user identifier management process 306 rejects user identifier 316. In the event that graphical comparison 334 returns fewer than maximum number of matching graphical features 346 in policy 328, user identifier management process 306 accepts user identifier 316 and stores user identifier 316 in plurality of user identifiers 312. In some illustrative embodiments, user identifier management process 306 also sends acceptance message 348 to data processing system 304. Acceptance message 348 indicates that user identifier 316 is permitted by policy 328 and has been stored in plurality of user identifiers 312.

In other illustrative embodiments, data processing system 302 contains and/or has access to table of character variants 352. Table of character variants 352 is a listing of character variants 354 for number of characters 344 in each of user identifier 324 in plurality of user identifiers 312. In other words, if a character in number of characters 344 is known to have one or more character variants 354, table of character variants 352 contains character variants 354 for the character. For example, assume that number of characters 344 and/or number of characters 325 are Unicode characters 356. Unicode characters 356 are characters that are in the Unicode character set and have Unicode code values. In the event that the character "北" with the code point U+5317 is present in number of characters 344, table of character variants 352 contains the character "北" and/or the code point U+5317 because the character "北" with the code point U+5317 has the character variant "北" with the code point U+F963. In these examples, table of character variants 352 is generated by a human. However, in other illustrative embodiments, table of character variants 352 is generated by graphical comparison 334 between number of characters 344 and the characters in the Unicode character set.

In embodiments in which data processing system 302 contains or has access to table of character variants 352, user identifier management process 306 determines whether number of characters 325 in user identifier 316 has number of variants 360 for number of characters 344 in user identifier 324. More specifically, user identifier management process 306 determines whether character 338 in number of characters 325 is present in table of character variants 352. In the event that character 338 in number of characters 325 is present in table of character variants 352, user identifier management process 306 determines whether user identifier 324 contains variant 362 of character 338 in position 358. Position 358 is the location of character 338 within number of characters 325. For example, position 358 is "4" for the character "1" in "apple."

In the event that user identifier 324 contains a variant of character 338 in position 358, user identifier management process 306 increases number of matching characters 350 by one. User identifier management process 306 determines whether user identifier 324 contains a variant of character 338 in position 358 for each character 338 in number of characters 325.

Once number of matching characters 350 has been identified, user identifier management process 306 compares number of matching characters 350 with maximum number of matching characters 364. Maximum number of matching characters 364 in policy 328 is a value for number of matching characters 350 such that user identifier 316 is not permitted by policy 328 when number of matching characters 350 exceeds maximum number of matching characters 364. For example, in one preferred embodiment, the policy for the maximum number of matching graphical features 346 may be set to five matching characters. In such an illustrative example, user identifier 316 is rejected by user identifier management process 306 when number of matching characters 350 is about seven.

In the event that number of matching characters 350 is at or below maximum number of matching characters 364, user identifier 316 is accepted and stored in plurality of user identifiers 312. In some illustrative embodiments, acceptance message 348 is sent to data processing system 304 indicating that user identifier 316 has been accepted and stored in plurality of user identifiers 312. Acceptance message 348 is presented to user 319 by data processing system 304.

The illustration of user identifier management environment 300 in FIG. 3 is not meant to imply physical or architectural limitations to the manner in which different illustrative embodiments may be implemented. Other components in addition and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, policy 328 may contain both maximum number of matching characters 364 and maximum number of matching graphical features 346. In such illustrative embodiments, user identifier management process 306 may perform graphical comparison 334 and identify number of matching characters 350 for user identifier 316 using table of character variants 352. Additionally, user identifier 316 may be rejected if either number of variants 360 exceeds maximum number of matching characters 364 and/or maximum number of matching graphical features 346 between number of graphical features 342 and number of graphical features 336 is exceeded.

Additionally, user identifier management process 306 may be a component of systems instead of social network 308. For example, user identifier management process 306 may be used in the generation of accounts for users of a Web-based e-mail system. Also, in some illustrative embodiments, acceptance message 348 is sent to data processing system 304 in response 366. Response 366 may be sent to data processing system 304 over a network, such as network 102 in FIG. 1.

Figure 4:
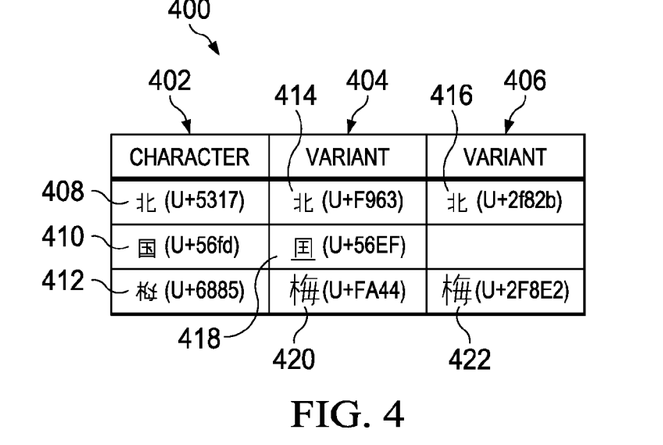
FIG. 4 is an illustration of a block diagram of a table of character variants in accordance with an illustrative embodiment.

Turning now to FIG. 4, an illustration of a block diagram of a table of character variants is depicted in accordance with an illustrative embodiment. Table of character variants 400 is an example implementation of table of character variants 352 in FIG. 3.

In these examples, Chinese characters are contained in table of character variants 400. Character variants have two forms in Chinese. The first form of character variants is well known written variants: Simplified and Traditional, in which a Simplified character is written differently, and thus looks different from its Traditional equivalent, but pronounced and means the same or similar. The second form of character variants consists of less known resemblance variants in which two or more characters are written similarly, and thus look the same or similar, but may be pronounced the same or differently. In these examples, character variants refer to the resemblance variants.

Resemblance character variants exist in all regions where Chinese characters are used, such as Mainland China, Hong Kong, Macau, Taiwan, Singapore, Japan, North Korea, and South Korea. Resemblance variants may initially be sourced from a single character in one language, Chinese for example, that was adopted by other languages, Japan, Korea, and Singapore for example. The resemblance variants may gradually have become a part of the other languages without change of the written format. As a result, the original character and variants of the original character were all added in the Unicode table that contains characters from hundreds of languages. Each character and the variants of the character with a distinct code point are treated as a unique character by computers, although the character and the variants of the character look alike visually. A user may input each of the character variants by using a Unicode input method, for example, a Unicode editor).

Although the "Han Unification" (Unihan) intends to map multiple character variants into a single one to unify these variants used in different languages, the current Unicode table still contains a large number of Chinese variant characters. For example, for 3500 commonly used Simplified Chinese characters in the Unihan database, which is a Chinese, Japanese, Korean character database in Unicode table, 937 characters have one or more resemblance variants. Such characters account for 26.77% of the characters in the Unihan database.

Table of character variants 400 contains character column 402, variant column 404, and variant column 406. Character column 402 contains characters that have one or more character variants. In this illustrative example, character column 402 contains characters 408, 410, and 412.

Character 408 has variant 414 and variant 416. Variant 414 and variant 416 are visually similar or identical to character 408, but have different code points in the character code system. In this illustrative example, character 408 has the code point U+5317, while variant 414 has the code point U+F963 and variant 416 has the code point U+2F82B. Likewise, character 410 has variant 418. Character 410 has the code point U+56FD, while variant 418 has the code point U+56EF.

Character 412 in table of character variants 400 has variant 420 and variant 422. Character 412 represents the code point U+6885, but variant 420 represents code point U+FA44 and variant 422 represents code point U+2F8E2. Of course, each of characters 408, 410, and 412 may have additional or fewer variants in other illustrative embodiments.

Figure 5:
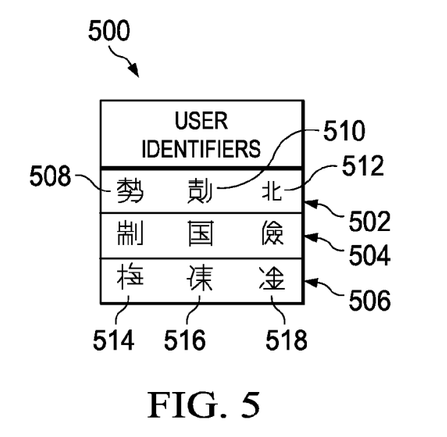
FIG. 5 is an illustration of a plurality of user identifiers in accordance with an illustrative embodiment.
Figure 6:
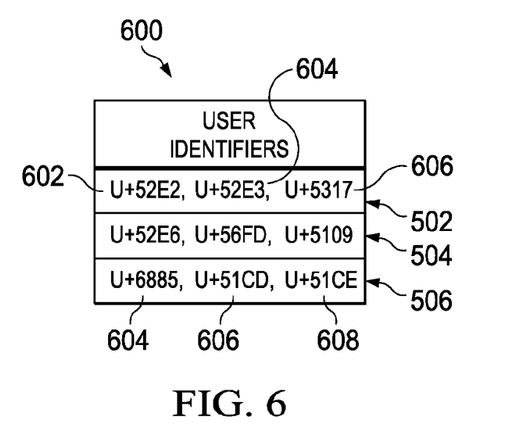
FIG. 6 is an illustration of a code point representation of a plurality of user identifiers in accordance with an illustrative embodiment.

FIGS. 5 and 6 are illustrations of a plurality of user identifiers depicted in accordance with an illustrative embodiment. FIG. 5 depicts a character representation of the plurality of user identifiers. FIG. 6 depicts a code point representation of the plurality of user identifiers.

Looking now to FIG. 5, an illustration of a plurality of user identifiers is depicted in accordance with an illustrative embodiment. Plurality of user identifiers 500 is an example implementation of plurality of user identifiers 312 in FIG. 3.

Plurality of user identifiers 500 are existing user identifiers in a data processing system, such as data processing system 302 in FIG. 3. Plurality of user identifiers 500 contains user identifier 502, user identifier 504, and user identifier 506 in this illustrative example. User identifiers 502, 504, and 506 each contain a number of characters. For example, user identifier 502 contains characters 508, 510, and 512. Likewise, user identifier 506 contains characters 514, 516, and 518.

Turning now to FIG. 6, an illustration of a code point representation of a plurality of user identifiers is depicted in accordance with an illustrative embodiment. Plurality of user identifiers 600 is another representation of plurality of user identifiers 500 in FIG. 5. More specifically, plurality of user identifiers 600 represents user identifiers with the code points of the characters within each user identifier.

In this illustrative example, user identifiers 502, 504, and 506 in FIG. 5 are represented with the Unicode codes of the characters contained within the user identifiers. For example, user identifier 502 consists of character codes 602, 604, and 606. In this illustrative example, character code 602 is the Unicode code representation for character 508. Likewise, character code 604 is the Unicode code representation for character 510, and character code 606 is the Unicode code representation for character 512 in FIG. 5.

Character code 604 is the Unicode code representation for character 514 in FIG. 5. Character code 606 is the Unicode code representation for character 516. Character code 608 is the Unicode code representation for character 518.

Figure 7:
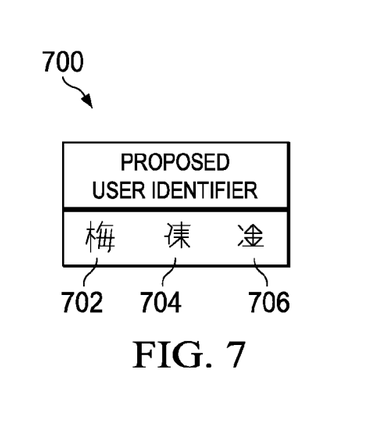
FIG. 7 is an illustration of a proposed user identifier in accordance with an illustrative embodiment.
Figure 8:
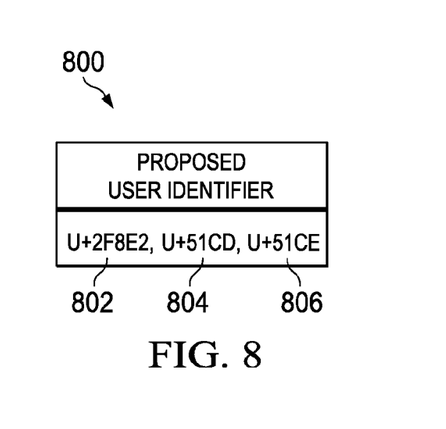
FIG. 8 is an illustration of a code point representation for a proposed user identifier in accordance with an illustrative embodiment.

FIGS. 7 and 8 are illustrations of a proposed user identifier depicted in accordance with an illustrative embodiment. FIG. 7 depicts a character representation of the proposed user identifier. FIG. 8 depicts a code point representation of the proposed user identifier.

Turning to FIG. 7, an illustration of a proposed user identifier is depicted in accordance with an illustrative embodiment. Proposed user identifier 700 is an example implementation of user identifier 316 in FIG. 3.

In this illustrative example, proposed user identifier 700 is input by a user that desires to generate a user account on a data processing system, such as data processing system 302. Proposed user identifier 700 consists of characters 702, 704, and 706. Proposed user identifier 700 is received in a request, such as request 318 in FIG. 3. A determination is made whether proposed user identifier 700 matches an existing user identifier in plurality of user identifiers 500 in FIG. 5. In this illustrative embodiment, a policy for a minimum degree of character variation containing a maximum number of matching characters, such as maximum number of matching characters 364 in FIG. 3, is used to make such a determination.

Turning now to FIG. 8, an illustration of a code point representation for a proposed user identifier is depicted in accordance with an illustrative embodiment. Proposed user identifier 800 is a representation of proposed user identifier 700 in FIG. 7 in which each character in proposed user identifier 700 is represented with a code point for the character.

In this illustrative example, proposed user identifier 800 is represented with Unicode codes for each character in proposed user identifier 800. For example, code point 802 is the Unicode code for character 702 in FIG. 7. Likewise, code point 804 is the Unicode code for character 704. Code point 806 is the Unicode code for character 706.

A user identifier management process, such as user identifier management process 306 in FIG. 3, uses proposed user identifier 800 to determine whether proposed user identifier 800 matches an existing user identifier in plurality of user identifiers 500 in FIG. 5. In this illustrative example, the policy used by the user identifier management process indicates that a proposed user identifier may not have three or more matching characters.

A character matches when the character in the proposed user identifier has the same code point as the character in the same position within an existing user identifier. A character also matches when the character in the proposed user identifier has the code point of a character variant of the character in the same position within an existing user identifier. Of course, the policy may indicate, in other illustrative embodiments, that the number of matching characters may not exceed a percentage of the number of characters in the user identifier or another suitable measurement. For example, the policy may indicate that the number of matching characters may not exceed about 75% of the characters in an existing user identifier.

In this illustrative embodiment, the user identifier management process determines whether code point 802 is present in user identifier 502 at the first position. Code point 802 is not present in user identifier 502 at the first position. The user identifier management process then determines whether code point 602 is present in character column 402 of table of character variants 400 in FIG. 4. Because code point 602 is not present in character column 402, the user identifier management process determines that user identifier 502 does not match user identifier 502.

User identifier 502 has three characters and character 508 is not a match for character 802. Thus, proposed user identifier 800 does not have three or more matching characters as indicated by the policy. Likewise, user identifier 504 does not match proposed user identifier 800 because code point 804 does not have a character in the first position that matches proposed user identifier 800 and has three characters.

The user identifier management process then determines whether proposed user identifier 800 has a number of matching characters with user identifier 506 that exceeds the maximum number of matching characters in the policy. Code point 802 is not the same as code point 604. However, the user identifier management process determines that code point 802 is present in table of character variants 400 as variant 422 in FIG. 4. Variant 422 is a character variant of variant 420 and character 412. The user identifier management process determines that character 702 matches character 514 because code point 802 is a character variant of code point 604. Thus, the number of matching characters between proposed user identifier 800 and user identifier 506 is increased to one.

The user identifier management process then determines that code point 804 for the second position in proposed user identifier 800 matches code point 606 for the second position in user identifier 506. The number of matching characters is increased to two. Likewise, the user identifier management process determines that code point 806 for the third position in proposed user identifier 800 matches code point 608 for the third position in user identifier 506. The number of matching characters is increased to three. Thus, the user identifier management process rejects proposed user identifier 800 because proposed user identifier 800 is not permitted by the policy.

Figure 9:
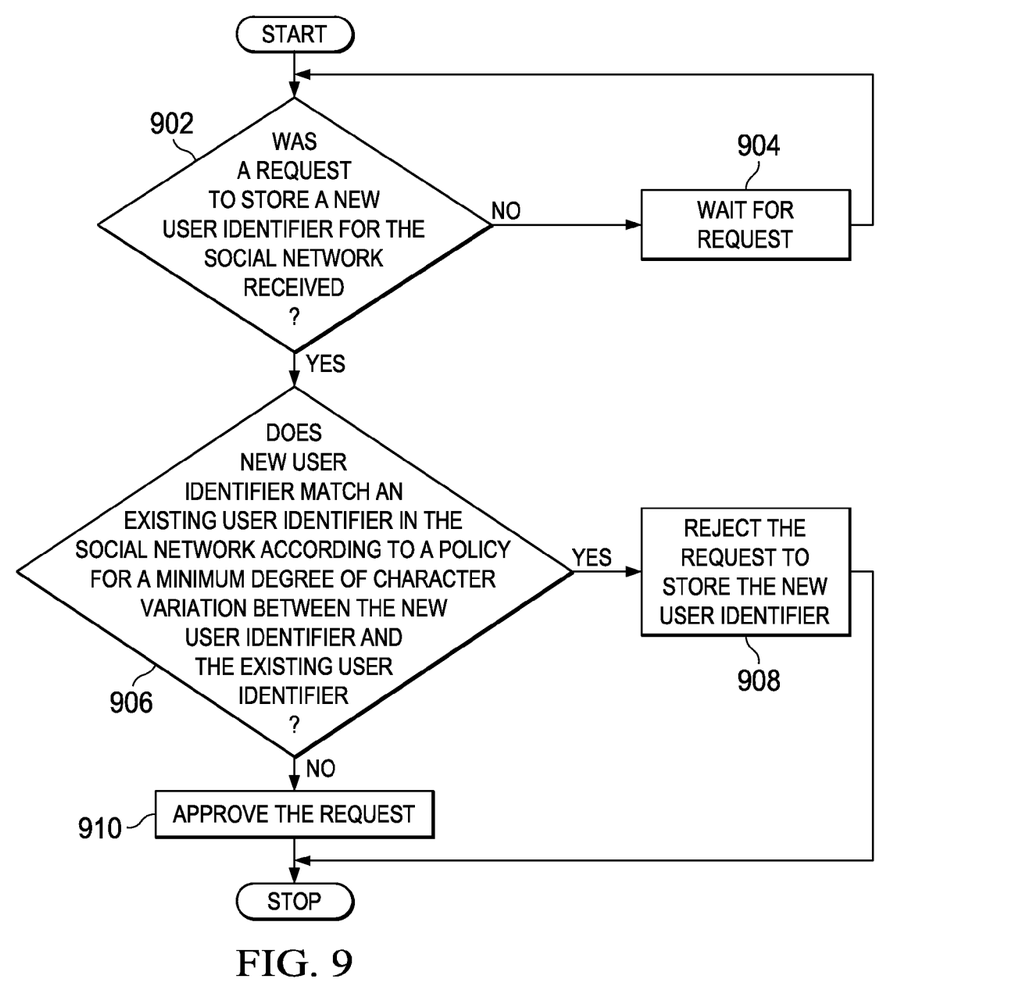
FIG. 9 is a flowchart of a method for managing a new user identifier in accordance with an illustrative embodiment.

Turning now to FIG. 9, a flowchart of a method for managing a new user identifier is depicted in accordance with an illustrative embodiment. The process may be implemented by user identifier management process 306 running in data processing system 302 in user identifier management environment 300 in FIG. 3.

The process begins by determining whether a request to store a new user identifier was received (step 902). The request may contain an acceptance of a terms of use agreement presented to a user. The terms of use may indicate the contents of the policy for a minimum degree of character variation between a proposed user identifier and existing user identifiers.

If the process determines that a request to store a new user identifier was not received, the process waits for a request (step 904) and returns to step 902. If the process determines at step 902 that a request to store a new user identifier was received, the process determines if the new user identifier matches an existing user identifier according to a policy for a minimum degree of character variation between the new user identifier and the existing user identifier (step 906).

The process may determine that the new user identifier matches the existing user identifier when the new user identifier exceeds a maximum number of matching characters with an existing user identifier. The number of matching characters consists of characters having the same code point at the same position in both the existing user identifier and the proposed user identifier. The number of matching characters also consists of characters having a code point in the proposed user identifier known to be a character variant of the code point at the same position in the existing user identifier.

If at step 906 the process determines that the new user identifier matches an existing user identifier according to a policy for a minimum degree of character variation between the new user identifier and the existing user identifier, the process rejects the request to store the new user identifier (step 908) and terminates thereafter. The process may reject the request by sending a rejection to the data processing system that sent the request. In other illustrative embodiments, the process may ignore the request and send no response.

If at step 906 the process determines that the new user identifier does not match an existing user identifier according to a policy for a minimum degree of character variation between the new user identifier and the existing user identifier, the process approves the request (step 910) and terminates thereafter. The process may send an acceptance to the data processing system that sent the request indicating that the user identifier has been stored.

Figure 10:
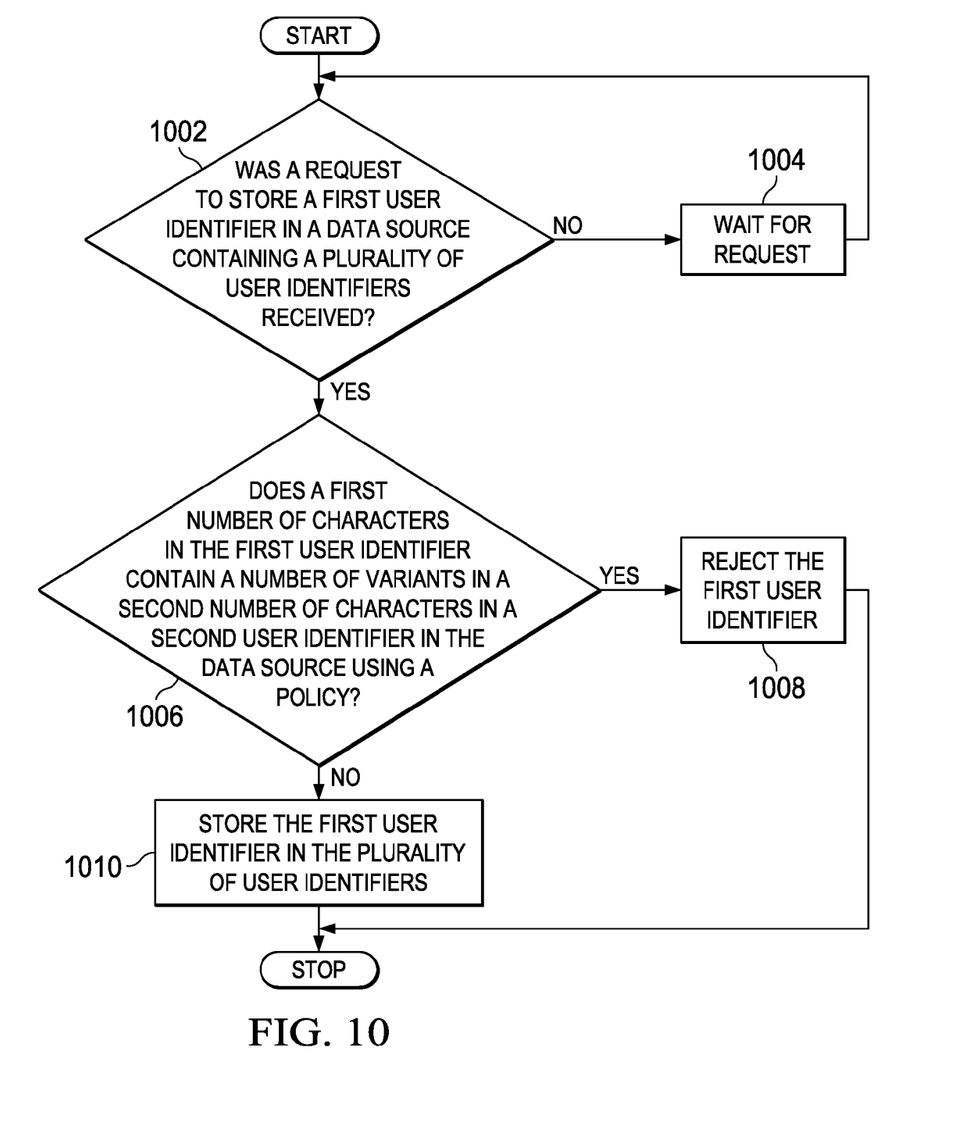
FIG. 10 is a flowchart of a process for managing user identifiers in accordance with an illustrative embodiment.

Turning now to FIG. 10, a flowchart of a process for managing user identifiers is depicted in accordance with an illustrative embodiment. The process may be implemented by user identifier management process 306 running in data processing system 302 in user identifier management environment 300 in FIG. 3.

The process begins by determining whether a request to store a first user identifier in a data source containing a plurality of user identifiers was received (step 1002). The request may contain an acceptance of a terms of use agreement presented to a user. The terms of use may indicate the contents of the policy for a minimum degree of character variation between a proposed user identifier and existing user identifiers.

If the process determines that a request to store a new user identifier was not received, the process waits for a request (step 1004) and returns to step 1002. If the process determines at step 1002 that a request to store a first user identifier in a data source containing a plurality of user identifiers was received, the process determines if a first number of characters in the first user identifier contains a number of variants in a second number of characters in a second user identifier in the data source using a policy (step 1006).

The process may determine that a first number of characters contains a number of variants in the second number of characters using a table of character variants. The first number of characters contain a number of variants in the second number of characters when a character in the first number of characters is stored in the table of character variants as a variant of the character in the second number of characters at the same position.

If at step 1006 the process determines that a first number of characters in the first user identifier contains a number of variants in a second number of characters in a second user identifier in the data source using a policy, the process rejects the first user identifier (step 1008) and terminates thereafter. If at step 1006 the process determines that a first number of characters in the first user identifier does not contain a number of variants in a second number of characters in a second user identifier in the data source using a policy, the process stores the first user identifier in the plurality of user identifiers (step 1010) and terminates thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, the process may send an acceptance after performing operation 910. The acceptance may indicate that the user identifier has been stored and that the user identifier may be used by the user. The process may also send a rejection after performing operation 908. In such an illustrative embodiment, the rejection may include the portion of the policy that caused the user identifier to not be permitted. For example, the rejection may include the maximum number of matching characters and an indication of which characters in the proposed user identifier are matching to an existing user identifier so the user may change the proposed user identifier and send another request.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, semiconductor system (apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output, or I/O devices (including but not limited to keyboards, displays, pointing devices, etc.), can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a new user identifier comprising:
   responsive to receiving a request to store the new user identifier, determining whether the new user identifier matches an existing user identifier according to a number of character variant matches between respective characters in the new user identifier and the existing user identifier;
   responsive to a determination that the new user identifier matches the existing user identifier according to the number of character variant matches between the respective characters in the new user identifier and the existing user identifier, rejecting the request to store the new user identifier; and
   responsive to an absence of a determination that the new user identifier matches the existing user identifier according to the number of character variant matches between the respective characters in the new user identifier and the existing user identifier, approving the request.

2. The method of claim 1, wherein a policy is used to specify the number of character variant matches, and wherein the policy comprises a table of character variants, wherein the table of character variants comprises the character variants for a number of characters in the existing user identifier.

3. The method of claim 1, wherein the step of determining whether the new user identifier matches the existing user identifier according to the number of character variant matches between the respective characters in the new user identifier and the existing user identifier comprises:
   identifying a first number of graphical features in the new user identifier and a second number of graphical features in the existing user identifier;
   determining whether a first number of graphical features in the new user identifier matches the second number of graphical features in the existing user identifier; and
   responsive to a determination that the first number of graphical features in the new user identifier matches the second number of graphical features in the existing user identifier, determining that the first number of characters in the new user identifier contains the number of character variant matches between the respective characters in the new user identifier and the existing user identifier.

4. A method for managing user identifiers comprising:
   responsive to receiving a request to store a first user identifier in a data source containing a plurality of user identifiers, determining whether a first number of characters in the first user identifier contains a number of variants in a second number of characters in a second user identifier in the data source using a policy;
   responsive to a determination that the first number of characters in the first user identifier contains the number of variants in the second number of characters in the second user identifier in the data source using the policy, rejecting the first user identifier; and
   responsive to an absence of a determination that the first number of characters in the first user identifier contains the number of variants in the second number of characters in the second user identifier in the data source using the policy, storing the first user identifier in the plurality of user identifiers.

5. The method of claim 4, wherein the step of determining whether the first number of characters in the first user identifier contains the number of variants in the second number of characters in the second user identifier in the data source using the policy comprises:

determining whether a character in the first number of characters is present in a table of character variants; and     responsive to a determination that the character in the first number of characters is present in the table of character variants, determining whether the second number of characters contains a variant of the character at a position.

6. The method of claim 5, wherein the step of determining whether the first number of characters in the first user identifier contain the number of variants in the second number of characters in the second user identifier in the data source using the policy further comprises:

repeating the step of determining whether the character in the first number of characters is present in the table of character variants and the step of determining whether the second number of characters contains the character at the position for each of the first number of characters using the policy to form a number of matching characters;

determining whether the number of matching characters exceeds a maximum number of matching characters in the policy; and     responsive to a determination that the number of matching characters exceeds the maximum number of matching characters in the policy, determining that the first number of characters in the first user identifier contains the number of variants in the second number of characters in the second user identifier in the data source using the policy.

7. The method of claim 4, wherein the step of determining whether the first number of characters in the first user identifier contain the number of variants of the second number of characters in the second user identifier in the data source using the policy comprises:

identifying a first number of graphical features in the first number of characters and a second number of graphical features in the second number of characters using the policy;

determining whether the first number of graphical features in the first number of characters matches the second number of graphical features in the second number of characters; and     responsive to a determination that the first number of graphical features in the first number of characters matches the second number of graphical features in the second number of characters, determining that the first number of characters in the first user identifier contains the number of variants of the second number of characters in the second user identifier in the data source using the policy.

8. The method of claim 7, wherein the policy comprises a maximum number of matching graphical features between the first number of graphical features and the second number of graphical features.

9. The method of claim 4, wherein the policy is presented in a terms of use agreement.

10. The method of claim 4, wherein the request is a first request, and further comprising:

generating a second request for a user approval of a terms of use agreement prior to performing the step of determining whether the first number of characters in the first user identifier contains the number of variants of the second number of characters in the second user identifier in the data source using the policy.

11. The method of claim 4 further comprising:

responsive to storing the first user identifier in the plurality of user identifiers, presenting an acceptance message for the first user identifier.

12. The method of claim 4, wherein the first number of characters and the second number of characters are Unicode characters.

\* \* \* \* \*